S. A. DOBYNE.
CLUTCH AND BRAKE MECHANISM.
APPLICATION FILED FEB. 10, 1917.
1,352,585.
Patented Sept. 14, 1920.
2 SHEETS—SHEET 2.
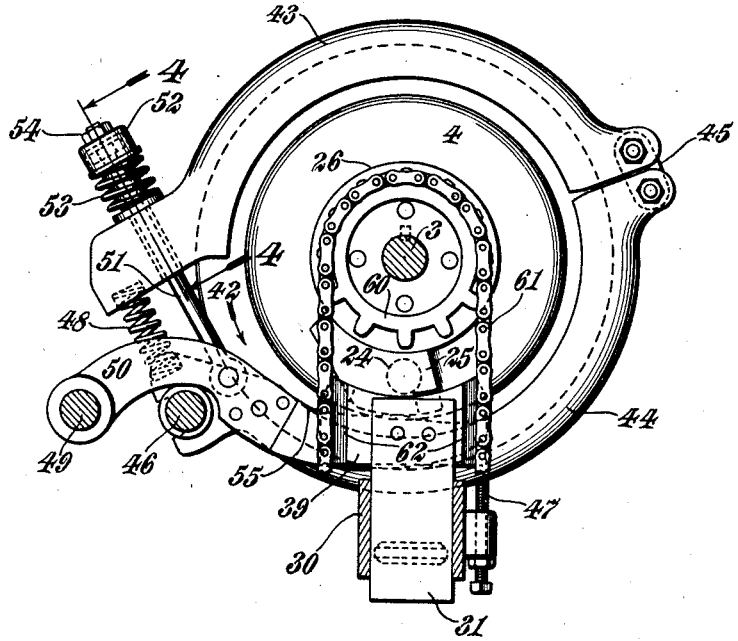
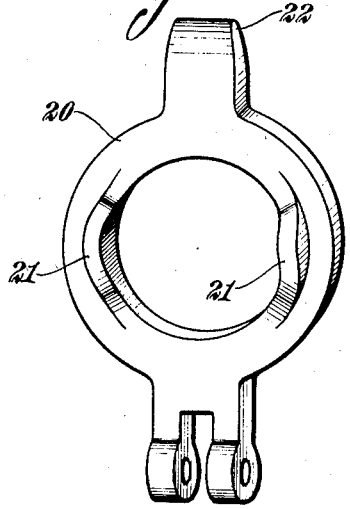
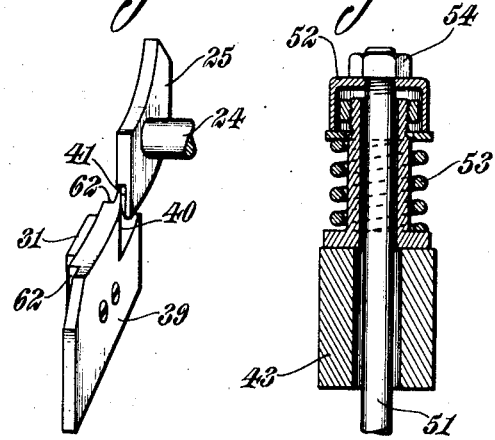
Inventor:
STEPHEN A. DOBYNE,
By John H. Bruninga
His Attorney.

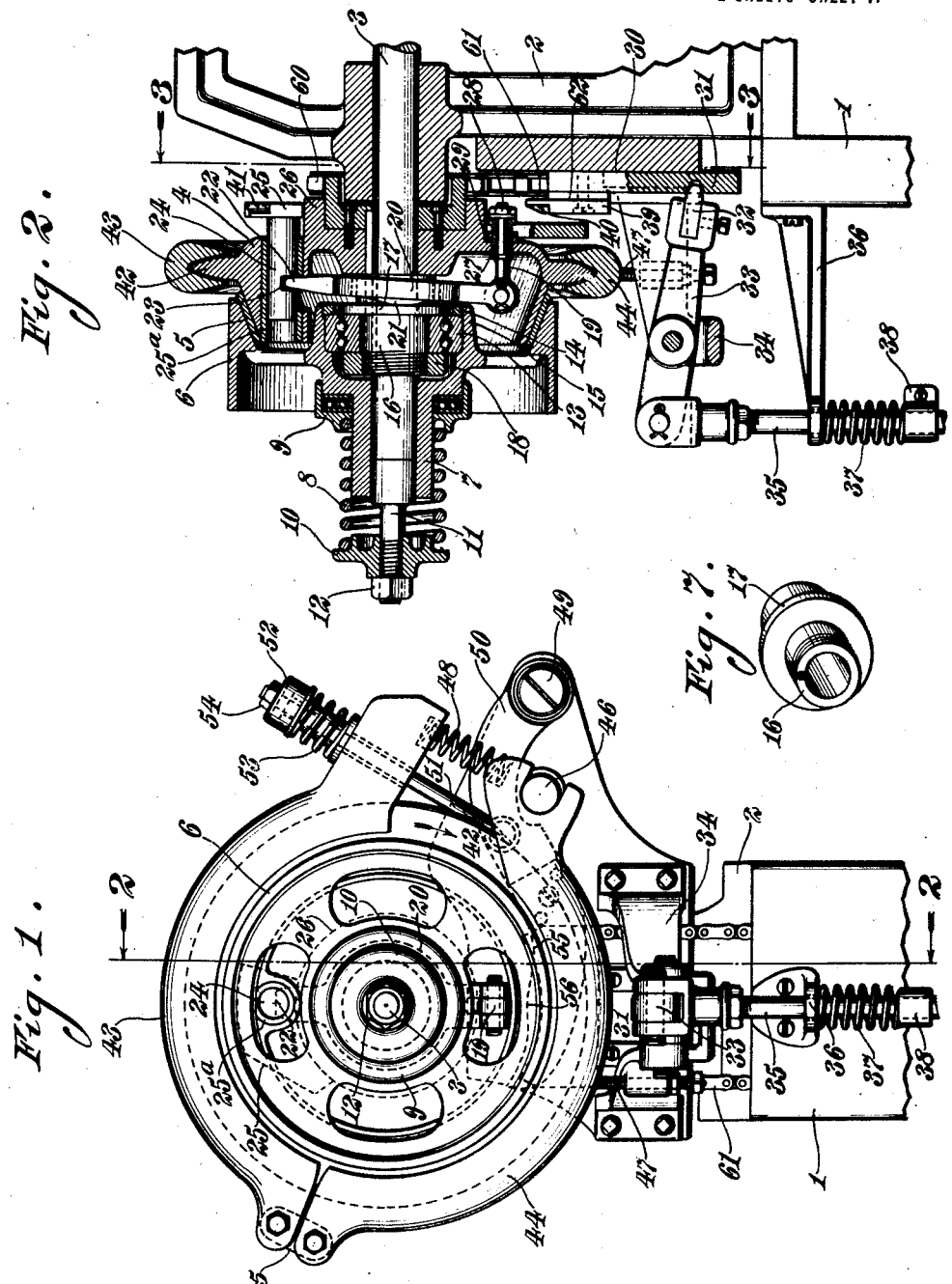

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

CLUTCH AND BRAKE MECHANISM.

1,352,585.      Specification of Letters Patent.     Patented Sept. 14, 1920.

Application filed February 10, 1917. Serial No. 147,943.

*To all whom it may concern:*

Be it known that I, STEPHEN A. DOBYNE, a citizen of the United States, and residing at St. Louis, Missouri, have invented the new and useful Improvement in Clutch and Brake Mechanism, of which the following is a specification.

This invention relates to a clutch and brake mechanism.

In some classes of machines, as in fastener inserting machines, it is necessary that the machine be arrested at a predetermined point, in order that the operation, such as the insertion of the last fastener, may be completed. Where a positive stop is used in coöperation with the brake, the inertia of the movable parts causes considerable shock when the machine is suddenly arrested.

One of the objects of this invention, therefore, is to provide a clutch and brake mechanism in which the inertia of the shaft is utilized to apply the brake immediately after the clutch has been shifted, so that the inertia of the drive shaft and of the parts connected therewith is absorbed in applying the brake, and thus to bring the drive shaft to a stop.

Another object is to provide clutch and brake mechanism which is simple in construction, effective in its operation, and cheap to manufacture.

Further objects will appear from the detail description taken in connection with the accompanying drawings.

In the accompanying drawings,

Figure 1 is an end elevation of a clutch embodying this invention;

Fig. 2 is a section on the line 2—2, of Fig. 1;

Fig. 3 is a section on the line 3—3, of Fig. 2;

Fig. 4 is an enlarged section on the line 4—4, of Fig. 3;

Fig. 5 is a detail perspective view of two of the shifting members of the clutch;

Fig. 6 is a detail perspective view of the shifting fork; and,

Fig. 7 is a detail perspective of the shifting collar.

Referring to the drawings, 1 designates a column upon which is supported a machine head 2 which carries, in this case, fastener inserting mechanism of the character shown and described in my application, Serial Number 830,050, filed April 6, 1914. Mounted in this machine head is a driven shaft 3 to which is keyed, the fixed member or element 4 of the clutch, which has a leather or asbestos cone facing 5 coöperating with a corresponding face on the pulley or element 6, whose hub 7 is loosely mounted on the driven shaft. A spring 8 is mounted on the hub 7 between a ball thrust bearing 9, and a sleeve 10 mounted on an extension 11 of the driven shaft and adjustable by means of a nut 12. This spring operates to move the pulley 6 into engagement with the fixed clutch member 4.

The pulley 6 is bored to receive the ball-bearing 13, which is held in position by a clamping ring 14, threaded into the hub 15 of the pulley. A sleeve 16, shown in detail in Fig. 7, has a collar 17 bearing against roller-bearing 13, and a nut 18 threaded on the sleeve clamps this sleeve to the roller-bearing. The sleeve 16, roller-bearing 13 and the hub 15 are thus secured together against relative endwise movement. Pivoted on a support 19 is a shifting fork 20 embracing the collar 16 and having rounded lugs 21 bearing against the flange 17 on the collar. The end 22 of this fork engages the recess 23 in the shank 24 of a clutch shifting element, which shank slides in a bushing 25ª in the fixed member 4 of the clutch. This shank has a head 25 whose inner face is of arcuate form to coöperate with the cylindrical face of the hub 26 on the fixed clutch member 4. The shank of the support 19 is threaded into a sleeve 27, in turn mounted in the fixed member 4, the shank being reduced in diameter where it enters the sleeve to form a shoulder. The shank is provided with an angular head and with a lock-nut 28, while the sleeve is provided with a lock-nut 29. In this way, by adjustment of the angular head of the sleeve 27, the fork 20 can be adjusted to take up wear.

Mounted on the machine head 2 is a guide 30 for the slide 31 of a controller, which slide is engaged by the end 32 of a lever 33, pivoted on a bracket 34 on the machine head, and connected to a clutch rod 35 passing through a bracket 36 on the column 1. A spring 37 mounted between the bracket 36 and a collar 38 on the clutch rod, normally tends to move this clutch rod down and the slide 31 up. The slide 31 has mounted thereon a hardened block 39 which has a beveled face 40 coöperating with a beveled face 41 on the hardened head 25.

Formed on the fixed clutch member 4 is an annular rib 42 coöperating with a pair of brake-shoes 43—44, which are linked together by a link 45. The brake-shoe 44 is pivoted at 46 on the machine head and bears upon an adjustable screw 47, also on the machine head, while a spring 48 is mounted between the fixed end of the shoe 44 and the free end of the shoe 43. Pivoted at 49 on the machine head is the arm 50 of a brake actuator connected by a link 51 to the free end of the brake-shoe 43, this link passing loosely through the brake-shoe and having a sleeve 52, between which sleeve and the brake-shoe, is mounted a spring 53, the tension of which can be adjusted by the nut 54 on the link. The end of the arm 50 extends underneath, but normally out of the path of the head 25, and is arcuate partly, as shown at 55, and has a hump, as shown at 56.

Assuming the parts to be in the position shown in Figs. 1 and 2, with the clutch members 4 and 6 in engagement and the brake-shoes out of engagement with the rib 42. At this time, the head 25 will be out of the path of the arm 50, so that the pulley 6 can rotate the driven shaft. If now the clutch treadle, (not shown) is released, the spring 37 will depress the clutch rod 35 and raise the slide 30, so as to throw the block 39 in the path of the head 25. As the beveled faces 40 and 41 move into engagement, they will, by wedging action, cause the shank 24 to move to the left, Fig. 2, thus rocking the fork 20 on its pivot to the left, and moving the clutch pulley 6 out of engagement with the clutch member 4 fixed to the driven shaft 3. At this time, the head 25 is permitted to move laterally, as it is then in a position to clear the face 55 of the arm 50, and move into alinement with the arm. Further rotation of the fixed clutch member with the driven shaft under the inertia of the driven shaft and the parts connected thereto, will cause the outer-cylindrical face of the head 25 to engage the hump 56 on the arm 50, and swing this arm downwardly, as shown in Fig. 3, so as to positively move the brake-shoes 43—44, into firm gripping engagement with the rib 42. The parts are so timed that the movement of the brake-shoes into braking engagement with the fixed clutch member 4, will occur immediately after—and in fact practically coincident with the disengagement of the pulley 6 with the fixed clutch member 4, so that the driven shaft 3 will come to a stop with the clutch members disengaged and held disengaged, and with the brake-shoes applied. It will further be seen that the inertia of the driven shaft and of the parts connected thereto, is utilized to apply the brake at the time of the release of the clutch. It will, of course, be understood that when the clutch treadle is again depressed to drop the slide 31, the block 39 is then moved out of engagement with the head 25, so that this head is, under the tension of the spring 8, allowed to move to the right, thereby first releasing the arm 50 and permitting the brake-shoes to move out of engagement, and immediately thereafter, the clutch member 26 is thrown into engagement with the clutch member 4.

The fixed clutch member 4 has bolted thereto, a sprocket 60 over which passes a sprocket chain 61, driving a counter-shaft below, and not shown. In order to clear this chain the block 39 is cut away, as shown at 62. The adjustable stop 47 permits the brake-shoes to be accurately adjusted to the coöperating braking surface.

It will, therefore, be seen that a clutch mechanism is provided which is simple in construction and effective in its operation. While the brake mechanism acts to quickly stop the machine, this braking action is applied by utilizing the inertia of the parts connected to the driven shaft, so that the energy due to this inertia is absorbed, and as it gradually is dissipated, operates to gradually, but firmly and through a very short angle, bring the mechanism to a stop.

It is obvious that various changes may be made in the details of construction without departing from the spirit of this invention. It is, therefore, to be understood that this invention is not to be limited to the specific construction shown and described.

Having thus described the invention, what is claimed is:

1. In a machine of the class described, a driven shaft including a clutch element, a clutch for said shaft, means for shifting said clutch including a clutch shifting element, a brake for said shaft, means for actuating said brake, operative connections between said brake-actuating means and said shaft adapted to utilize the inertia of said shaft to apply said brake, and controlling means operable on said clutch shifting element adapted to cause said element to engage said brake-actuating means.

2. In a machine of the class described, a driven shaft, a clutch for said shaft including a clutch element, a brake for said shaft, means for shifting said clutch including a clutch shifting element, means for actuating said brake, and means for controlling said shifting element adapted to disengage said clutch element and adapted to cause said shifting element to coöperate with said actuating means to apply said brake.

3. In a machine of the class described, a driven shaft, a clutch for said shaft including a clutch element, a brake for said shaft, means for shifting said clutch including a clutch shifting element, means for actuating said brake, and means for controlling said shifting element adapted to disengage said clutch element and adapted to cause said shifting element to coöperate with said actuating means and operate under the inertia of said shaft to apply said brake.

4. In a machine of the class described, a driven shaft, a clutch for said shaft including a clutch element, a brake for said shaft, means including a clutch shifting element, rotatable with said shaft adapted to shift said clutch, means for actuating said brake, and means for controlling said shifting means adapted to cause said shifting element to move into engagement with said actuating means and operate by inertia to apply said brake.

5. In a machine of the class described, a driven shaft, a clutch for said shaft, a brake for said shaft, a clutch shifter rotating with said shaft, an actuator for said brake, and a controller adpated to engage said shifter to disengage said clutch and adapted to position said shifter to engage said actuator to apply said brake.

6. In a machine of the class described, a driven shaft, a clutch for said shaft, a brake for said shaft, an actuator for said brake, a clutch shifter rotating with said shaft and movable into and out of coöperative relation with said actuator, and a controller adapted to engage said shifter to disengage said clutch and adapted to position said shifter to engage said actuator to apply said brake.

7. In a machine of the class described, a driven shaft, a clutch for said shaft, a brake for said shaft, an actuator for said brake, a clutch shifter rotating with said shaft and movable into and out of coöperative relation with said actuator, and a controller movable into the path of said shifter adapted to move said shifter to disengage said clutch and engage said actuator to apply said brake.

8. In a machine of the class described, a driven shaft, a clutch for said shaft, a brake for said shaft, an actuator for said brake, a clutch shifter rotating with said shaft and movable axially into and out of coöperative relation with said actuator, and a controller movable into the path of said shifter adapted to disengage said clutch and to cause said shifter to aline with and engage said actuator to apply said clutch.

9. In a machine of the class described, a driven shaft, a clutch for said shaft, a brake for said shaft, an actuator for said brake, a clutch shifter rotating with said shaft and movable axially into and out of coöperative relation with said actuator, and a controller having a part movable into the path of and engaging a corresponding part on said shifter adapted to disengage said clutch to cause said shifter to aline with and engage said actuator to apply said clutch.

10. In a machine of the class described, a driven shaft, a clutch for said shaft, a brake for said shaft, an actuator for said brake, a clutch shifter rotating with said shaft and movable into and out of coöperative relation with said actuator, a controller movable into the path of said shifter adapted to move said shifter to disengage said clutch and engage said actuator to apply said brake, and means for adjusting said shifter.

11. In a machine of the class described, a driven shaft, a clutch for said shaft, a brake for said shaft, an actuator for said brake, a clutch shifter rotating with said shaft and movable axially into and out of coöperative relation with said actuator, a guide for said shifter, and a controller movable into the path of said shifter adapted to disengage said clutch and to cause said shifter to aline with and engage said actuator to apply said clutch.

In testimony whereof I affix my signature this 10th day of October, 1916.

STEPHEN A. DOBYNE.